United States Patent [19]
Kiyosaki et al.

[11] Patent Number: 6,106,300
[45] Date of Patent: Aug. 22, 2000

[54] GAME FOR TEACHING FUNDAMENTAL ASPECTS OF PERSONAL FINANCE, INVESTING AND ACCOUNTING TO CHILDREN

[75] Inventors: Robert T. Kiyosaki, Phoenix; Rolf H. Parta, Glendale; Sharon L. Lechter, Paradise Valley, all of Ariz.

[73] Assignee: Cashflow Technologies, Inc., Reno, Nev.

[21] Appl. No.: 09/353,910

[22] Filed: Jul. 15, 1999

[51] Int. Cl.[7] .................................................. G09B 19/18
[52] U.S. Cl. ........................................ 434/107; 273/256
[58] Field of Search .................................. 434/107, 110, 434/128, 129; 273/236, 243, 256, 278

[56] References Cited

U.S. PATENT DOCUMENTS

| | | | |
|---|---|---|---|
| 2,297,011 | 9/1942 | Mooney | 434/107 |
| 3,807,739 | 4/1974 | Henley et al. | 273/256 |
| 4,012,046 | 3/1977 | Liket | 273/243 |
| 4,109,918 | 8/1978 | Mele et al. | 273/256 |
| 4,279,422 | 7/1981 | Shaw . | |
| 4,378,942 | 4/1983 | Isaac . | |
| 4,522,407 | 6/1985 | Hatherley . | |
| 4,840,382 | 6/1989 | Rubin . | |
| 4,890,844 | 1/1990 | Weiss . | |
| 4,932,668 | 6/1990 | Stewart | 273/256 |
| 4,955,616 | 9/1990 | Ingalls . | |
| 5,056,792 | 10/1991 | Helweg-Larsen et al. | 434/107 |
| 5,071,135 | 12/1991 | Campbell . | |
| 5,139,269 | 8/1992 | Peterson | 273/256 |
| 5,318,447 | 6/1994 | Mooney | 434/107 |
| 5,429,373 | 7/1995 | Chelko et al. | 434/107 |
| 5,826,878 | 10/1998 | Kiyosaki et al. | 273/256 |

FOREIGN PATENT DOCUMENTS

| | | |
|---|---|---|
| 0298 727 A2 | 1/1989 | European Pat. Off. . |
| 0382 369 A2 | 8/1990 | European Pat. Off. . |
| 801964 | 9/1958 | United Kingdom . |
| 1432761 | 4/1976 | United Kingdom . |
| 2196263 | 4/1988 | United Kingdom . |

*Primary Examiner*—Sam Rimell
*Attorney, Agent, or Firm*—Michael A. Lechter; Lorinda J. Howland; Squire, Sanders & Dempsey L.L.P

[57] ABSTRACT

The present invention provides a particularly effective mechanism for teaching financial skills to players, and, in particular children, in the context of a game. Each player is initially ascribed a predetermined periodic earned income, (at least initially representing income from work activities of the player), periodic expenses and a predetermined amount of cash on hand. The object of such game is for a player to generate passive income greater than a predetermined percentage (e.g., 100%) of the player's expenses. The game comprises: indicia of a financial statement associated with each player; and indicia of a set of events and indicia of a set of game events for pseudo-random assignment to the players in turn. A mechanism for pseudo-randomly assigning the particular game event to the respective players is the also included. The game events potentially affect at least one of the passive income, expenses, assets and liabilities of the players, and include opportunities to generate passive income. The financial statement includes respective selectively revisable visual indicia of units of passive income, units of periodic expenses, assets and liabilities, and preferably units of periodic earned income, ascribed to the associated player. Each of the visual indicia has a respective predetermined associated visual aspect (e.g., shape and/or color) associated financial are being represented. The number of units of each of the visual indicia are selectively revisable to reflect the effects of game events.

70 Claims, 7 Drawing Sheets

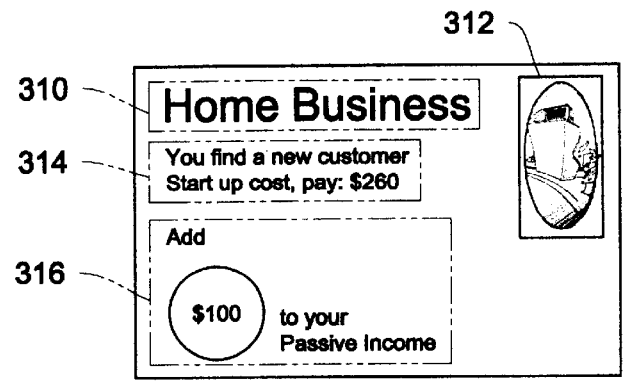
FIG. 3B
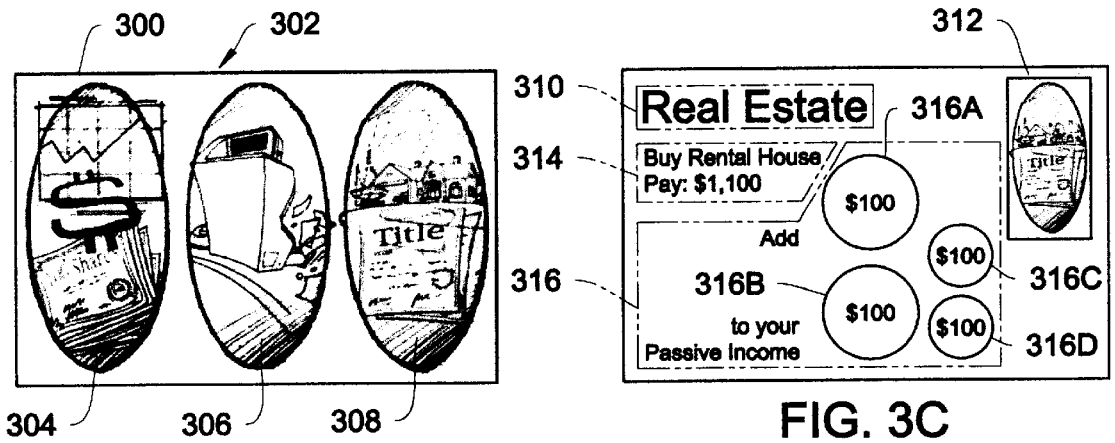
FIG. 3A
FIG. 3C
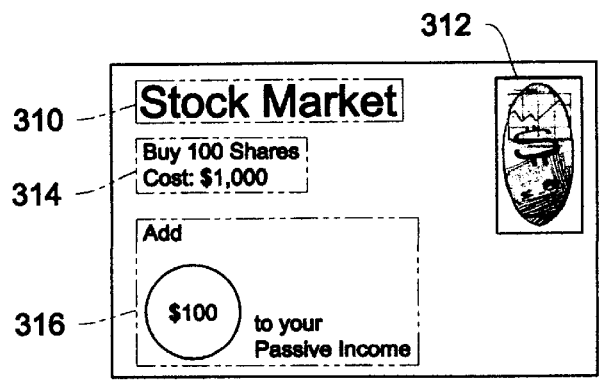
FIG. 3D

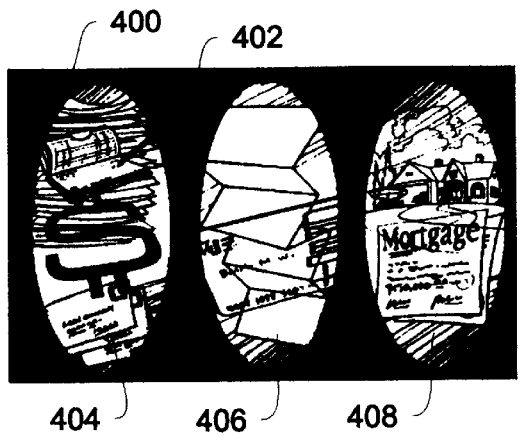
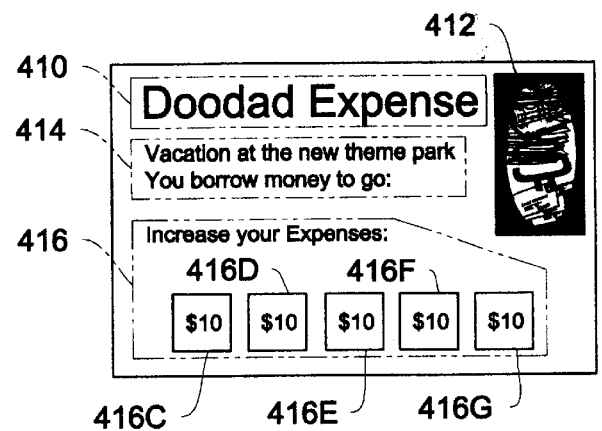
FIG. 4A  FIG. 4D
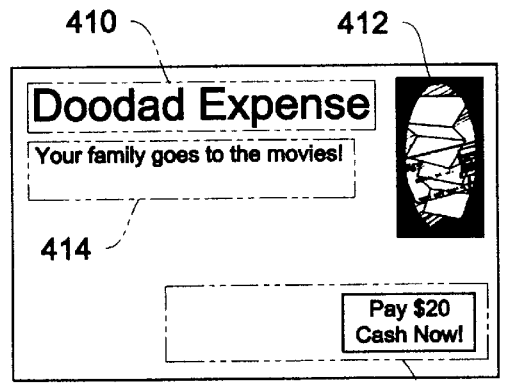
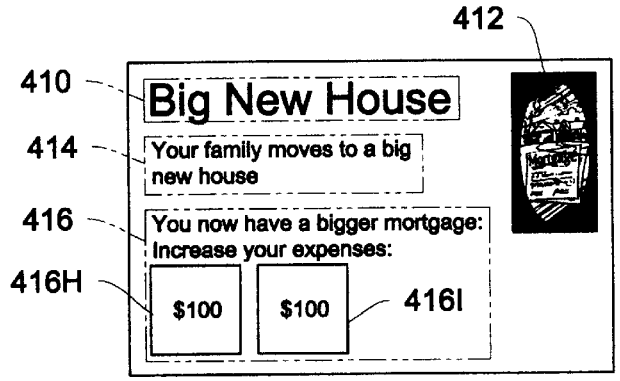
FIG. 4B  FIG. 4E
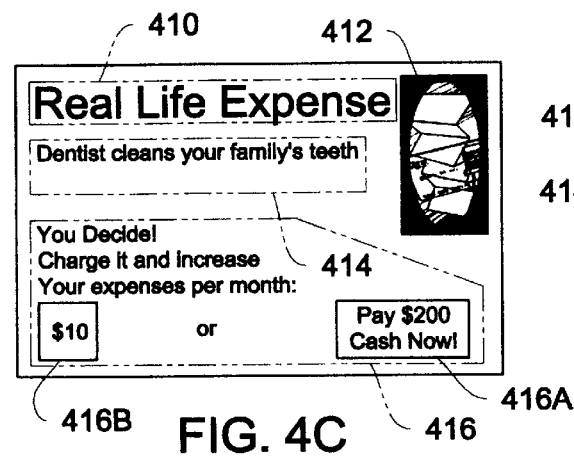
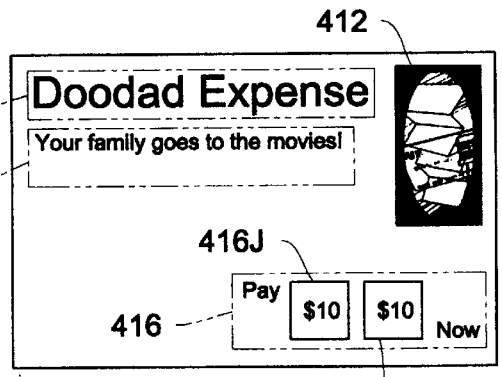
FIG. 4C  FIG. 4F

GAME FOR TEACHING FUNDAMENTAL ASPECTS OF PERSONAL FINANCE, INVESTING AND ACCOUNTING TO CHILDREN

FIELD OF THE INVENTION

This invention relates to the art of games and, more particularly, to a game for children which teaches the basic aspects of personal finance, investing and the relevant aspects of accounting including financial statements such as income statement and balance sheet.

BACKGROUND OF THE INVENTION

The old maxim of "study hard, get good grades, and find a high-paying job with a great pension" is no longer entirely relevant to today's world. In today's world of highly mobile professionals, aging population, defined contribution pension plans, and "entitlements," reliance upon company retirement plans or governmental Social Security programs and is arguably no longer prudent. As time goes on, individuals are likely to be required to rely upon their own resources to greater and greater extent. However, principles of personal finance, investing, accounting and the accumulation of wealth are not in the curricula of most formal institutions of learning. A tool for teaching such principles in the context of playing an entertaining game is described in commonly assigned U.S. Pat. No. 5,826,878 issued to Kiyosaki et al on Oct. 27, 1998, and co-pending application Ser. No. 9/177,723 filed by Kiyosaki et al on Oct. 23, 1998.

It is particularly important to teach basic principles of financial responsibility to children at an early age. However, teaching principles of finance to young children tends to be hindered by a lack of basic arithmetic skills.

It is highly desirable to provide a tool for teaching principles of personal finance, investing, accounting financial statements and the accumulation of wealth to relatively young children in a manner that is both fun and highly effective, yet requiring that the children be capable of only the most rudimentary mathematical calculations, e.g., counting objects to a total 10 and sorting objects based on colors, shapes or symbols. It is to these ends that present invention is directed.

SUMMARY OF THE INVENTION

The present invention provides a particularly effective mechanism for teaching financial skills to players, and, in particular children, in the context of a game. Each player is initially ascribed a predetermined periodic earned income, (at least initially representing income from work activities of the player), periodic expenses and a predetermined amount of cash on hand. The object of such game is for a player to generate passive income greater than a predetermined percentage (e.g., 100%) of the player's expenses. The game comprises: indicia of a financial statement associated with each player; and indicia of a set of events and indicia of a set of game events for pseudo-random assignment to the players in turn. A mechanism for pseudo-randomly assigning the particular game event to the respective players is also included. The game events potentially affect at least one of the passive income, expenses, assets and liabilities of the players, and include opportunities to generate passive income. The financial statement includes respective selectively revisable visual indicia of units of passive income, units of periodic expenses, assets and liabilities, and preferably units of periodic earned income, ascribed to the associated player. Each of the visual indicia has a respective predetermined associated visual aspect (e.g., shape and/or color) associated financial are being represented. The number of units of each of the visual indicia are selectively revisable to reflect the effects of game events.

BRIEF DESCRIPTION OF THE DRAWING

The preferred exemplary embodiment of the present invention will hereinafter be described in conjunction with the appended drawing, where like designations denote like elements, and:

FIG. 3 (consisting of FIGS. 3A–3D) show an exemplary back face (FIG. 3A), and exemplary information faces (FIGS. 3B–3D) of opportunity (e.g., asset) cards employed in the preferred embodiment of a game in accordance with the present invention;

FIG. 4 (consisting of FIGS. 4A–4F) show an exemplary back face (FIG. 4A), and exemplary information faces (FIGS. 4B–4D) of liability/expense cards employed in the preferred embodiment of a game in accordance with the present invention;

DETAILED DESCRIPTION OF A PREFERRED EXEMPLARY EMBODIMENT

A game in accordance with the present invention teaches the fundamental elements of cash flow management. In this context, the game offers children experience with the nature of assets (as used herein, things that generate incoming cash flow), and liabilities (as used herein, things that force outgoing pay out of money), and how people with assets that generate more money (passive income, portfolio income and residual earned income, collectively referred to herein as passive income) than the sum of their expenditures and expenses on liabilities are more successful, financially speaking, than families totally dependent on earned income (e.g., salary and salaries). In addition, the game also teaches basic counting and money exchange skills.

Figure 1:
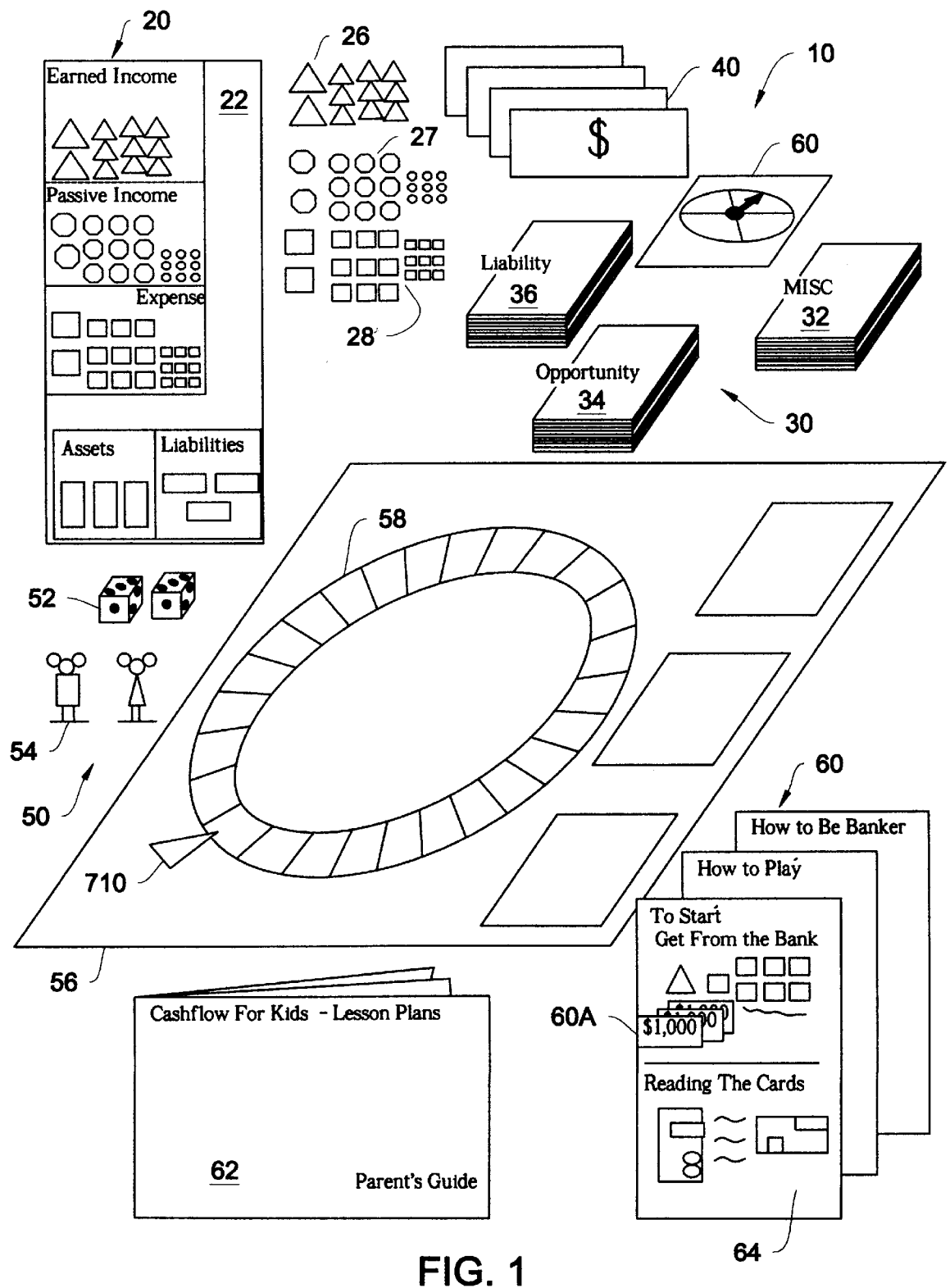
FIG. 1 is a schematic pictorial of a preferred embodiment of a game in accordance with the present invention.

Referring to FIG. 1, a game 10, in accordance with the present invention suitably comprises: a respective indicia of a financial statement 20 for each player, reflecting, as will be explained, e.g., the periodic earned income, passive income, periodic expenses, assets and liabilities of the associated player (sometimes hereinafter referred to as "financial statement indicia 20"); indicia 30 of a set of events potentially affecting at least one of the income (earned and/or passive), expenses, assets and liabilities of the player (sometimes hereinafter referred to as "game event indicia 30"); indicia of money 40 (e.g., play money in various denominations) and a suitable mechanism, generally indicated as 50, for designating respective particular events to be applied to the respective players.

In general, particular game events are designated for each player in turn, the player adjusts his or her cash on hand and financial statement accordingly, and the first player to achieve a passive income greater than his or her expenses wins. The game teaches the basics of cash flow management and money exchange without requiring pencil and paper arithmetic, or multiplication (and is thus suitable for relatively young children) by employing: visual representations of units of the respective financial status factors (earned income, passive income, expenses, assets and liabilities) with at least one different (distinguishable) visual aspect (e.g., shape, and/or color); simple unit denominations (e.g., 1000, 100, 10); and visually coordinated (e.g., color/shaped coded) event designators to facilitate association between financial factors and the game events.

As will be more fully discussed, in the preferred embodiment, game 10 is implemented as a board game: financial statement 20 comprises a printed sheet (or board) 22 (sometimes hereinafter referred to as game card 22) bearing graphics representing units of earned income, passive income, and expense, cooperating with respective corresponding tokens (earned income tokens 26, passive income tokens 27, and expense tokens 28); indicia of events 30 comprises respective decks (32, 34, 36) of printed cards (each card representing an event potentially affecting the financial status of the player), where the respective decks of cards correspond to different categories of events (Miscellaneous 32, Opportunity 34, Liability/Expense 36); and event designating mechanism 50 comprises a pseudo-random number generator (e.g., a pair of dice 52, or spinner), player tokens 54, and a game board 56, bearing a track 58 of spaces corresponding to the drawing of event cards of designated categories. If desired, additional elements may be included: pictorial instruction sheets 60 for children players, e.g., "how to be a banker" and "to start" and "how to play", as well as a more in depth instruction manual 62, (which may include a teaching curriculum of lesson plans to facilitate teaching financial concepts to children using game 10); and separate tokens (icons, playing pieces) representing various types (categories) of assets and liabilities, referred to in game event cards 32, 34 and 36.

Financial statement indicia 20 may comprise any mechanism for providing suitable visual, e.g., graphic, representations of the associated player's financial status factors, e.g., periodic earned income, periodic passive income, periodic expenses, assets and liabilities ascribed to the associated player. Representation of the financial factors graphically, e.g., as a number of unitary elements, as opposed to numerically, i.e., as a printed or displayed number, facilitates comprehension by younger players. In addition, the visual representations of the respective financial status factors are preferably chosen to have at least one different (distinguishable) visual aspect, e.g., shape, and/or color, to facilitate association between financial factors and the game events for younger players through color and/or shape coordination (coding). As noted above, in the preferred embodiment, financial statement 20 comprises a printed sheet (or board) 22 (sometimes hereinafter referred to as game card 22) bearing graphics representing "money" units of earned income, passive income, and expense, cooperating with respective corresponding tokens (earned income tokens 26, passive income tokens 27, and expense tokens 28). As a player's financial status is changed by game events, appropriate tokens are placed upon, or removed from, financial statement game card 22. Thus, financial status can be tracked without requiring mathematical calculations (beyond the most rudimentary nature); a child need only be capable of counting a relatively small number of objects (e.g., a total of ten) and sorting based on colors, shapes or symbols.

Figure 2:
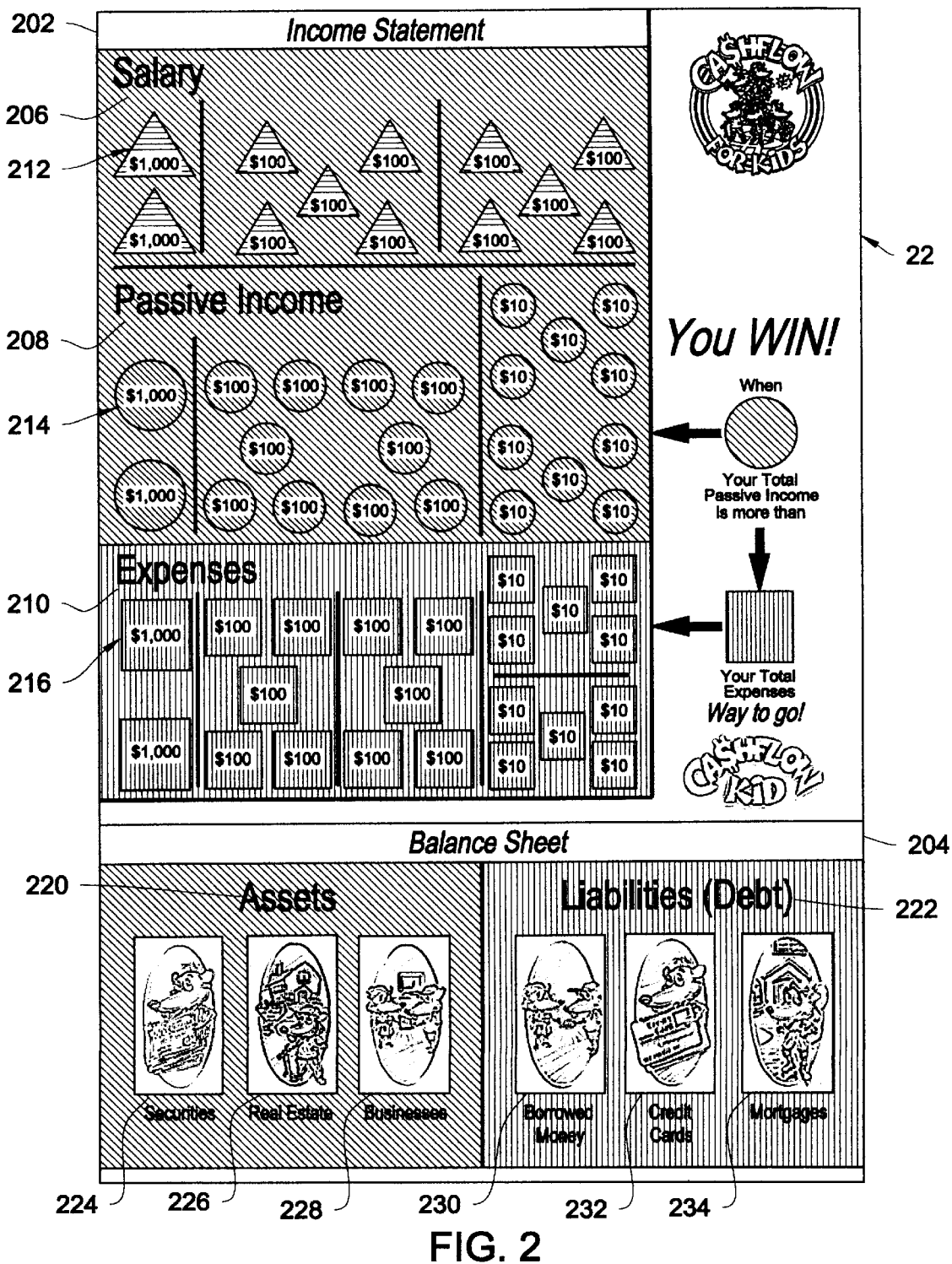
FIG. 2 is a schematic illustration of a financial statement indicia employed in the preferred embodiment of a game in accordance with the present invention.

More particularly, referring now to FIGS. 1 and 2, financial statement game card 22 preferably includes an income statement portion 202, and a balance sheet portion 204. Income statement portion 202 suitably includes: a section 206 relating to earned income (e.g., salary); a section 208 relating to passive income; and a section 210 relating to expense. Each section suitably includes graphic indicia (e.g., symbols) of money units of various denominations, corresponding to tokens 24: earned income section 206 includes symbols 212 corresponding to earned income tokens 26; passive income section 208 includes symbols 214 corresponding to passive income tokens 27, and expenses section 210 includes symbols 216 corresponding to expense tokens 28. Symbols 212, 214 and 216, correspond in visual aspect to the corresponding tokens 26, 27 and 28. Each of the financial factors suitably has an associated visual aspect, e.g., color and/or shape, to emphasize the difference between the respective factors, and facilitate correlation between game events and changes to the financial statement for younger players. For example, earned income symbols 212 and tokens 26 are suitably in the form of blue triangles, passive income symbols 214 and tokens 27 are suitably in the form of green circles, and expense symbols 216 and tokens 28 are suitably in the form of red squares. Preferably, the symbols are in outline (in the associated color), or include an internal feature (e.g., an interior portion of a different color or without color), to help differentiate between symbols and tokens placed over symbols. A similar background (e.g., same color) is employed for both earned income and passive income sections 206 and 208 to emphasize the relationship between those financial factors. Denomination is suitably indicated by size; the larger the symbol or token the greater the denomination. Three denominations are suitably represented: $1000, $100, and $10. If desired, for simplification, only two denominations, $1,000 and $100 may be employed for earned income. A predetermined number of symbols for each denomination is included in earned income, passive income, and expense sections 206, 208 and 210, for example, ten $10 symbols (where employed), ten $100 symbols, and two $1,000 symbols. The symbols of each denomination are disposed in groups of a predetermined number, e.g., five, to aid younger children in counting and tracking income and expenses.

As will be discussed, at the beginning of play, each player is provided with earned income tokens 26 representing periodic earned income ascribed to the player, and expense tokens 28 representing periodic expenses ascribed to the player, and initial predetermined "cash on hand", a sum of play money 40 (e.g., three $1,000 bills, although, the initial predetermined "cash on hand can be, if desired, zero). Starting earned income, as reflected by earned income tokens 26, is suitably set to a predetermined "round" number e.g., $1,000, for ease of "calculations". Starting total expenses, as reflected by expense tokens 28, are suitably set to a predetermined amount (e.g., $700), less by a predetermined percentage of earned income (e.g., 30%) than the amount of earned income, i.e., the net income received each "payday" is equal to the difference between earned income and expenses (e.g., $300), plus any passive income from assets. The amount of initial "cash on hand" is suitably chosen to be equal to a predetermined multiple (e.g., 10) of the difference between earned income and expenses (representing savings accumulated over a predetermined number (e.g., 10) of pay periods. The amount of each player's earned income, passive income, and expenses are typically varied by the game events, and reflected by providing additional to or taking away from the player representative tokens 26, 27 and/or 28.

Balance sheet portion 204 of financial statement game card 22 suitably includes an asset portion 220, and a liability (debt) portion 222. Asset portion 220 suitably includes graphical representations (symbols chosen to represent) 224, 226, and 228 of the various types of assets referred to in the game events. Similarly, liability portion 222 includes graphical representations (symbols chosen to represent) 230, 232, and 234 of the various types of liabilities referred to in the game events. As will be a more fully explained, each of the various types of assets and liabilities is represented by a distinctive symbol and/or color combination which is also employed in the indicia of events to facilitate correlation by the younger players. For example, assets may be categorized as real estate, securities (financial or paper assets such as stocks or bonds), or home businesses and each type (category) of asset may be represented particular unique symbol, depicted in representations 224, 226, and 228, e.g., real-estate is suitably represented by the image of a house, securities by the image of stock certificates, and business by the image of a computer. Categories of liability/expense may include: "real-life expenses" (e.g., unexpected medical or dental episodes); non-essential (luxury) purchases or entertainment expenses (sometimes hereinafter referred to as "doodad expenses"); and "lifestyle" (necessity) transactions. If desired, different orientations of the graphics can be employed to emphasize the distinction between assets and liabilities. Liability/expense can also (or alternatively) be categorized by the method of payment, e.g., cash, credit card, using borrowed money, or long-term secured debt such as a mortgage. For example, events requiring cash payments may be represented by the image of a checkbook and/or dollar sign symbol; events involving credit transactions by the image of a bill, and/or credit-card, and events requiring assumption of long-term or secured debt by the image of a house and mortgage. Also, as previously noted, separate tokens (icons, playing pieces) depicting the associated symbol (and/or color combination) may be provided to represent individual assets (e.g., real estate, securities, businesses) and liabilities (credit-card, borrowed money, secured debt) Since cash payments effect only cash on hand, and not level of periodic expenses, an icon for cash payment events is suitably omitted. Tokens are provided to the player, together with the adjustment to passive income 27 or expense 28 tokens called for by a particular event. Asset and liability icons (suitably three dimensional, or adapted to stand vertically) are placed on the representation 224–234 of the particular type of asset or liability on game card 22 to help facilitate visual assessment of the players financial status.

In an electronic implementation of financial statement indicia 20, symbols for earned income, passive income, expenses, assets and liabilities can be actuated or visualized (displayed) on a display in accordance with game events. Display/actuation of symbols on financial statement indicia 20 can be effected through any suitable mechanism, such as, for example, pointing and clicking a "deactivated" symbol shown on indicia 20, by dragging a token/symbol/icon onto the associated area of indicia 20, or depressing a designated key or button.

Game event indicia 30 may be implemented through any suitable visual display or representation of a set of events potentially affecting at least one of the income (earned and/or passive), expenses, assets and liabilities of the player. Game event indicia 30 suitably represents a number of different categories of events, e.g.,: opportunities; liabilities/expenses; and miscellaneous/bonus events (sometimes hereinafter referred to as "sunshine" events).

Opportunity events represent, e.g., opportunities to participate in transactions, e.g., acquire the various types of assets, to increase passive income. For example, as previously noted, the opportunity to acquire real estate, securities (financial or paper assets such as stocks or bonds), or home businesses may be represented. To facilitate correlation by younger players, a particular unique symbol is, as also previously noted, associated with each type of asset. For example, real estate is suitably represented by the image of a house, securities by the image of stock certificates, and business by the image of a computer. Several variations of each type of opportunity event are suitably included in the set of events, e.g., different combinations of cost and passive income generated. In addition, plural instances of particular events may be included in the set. The set of opportunity events suitably includes predetermined proportions of events involving the various types of assets. For example, the set of events may include 24.3% home business, 24.3% real estate, and 51.4% stock assets.

The indicia of an individual opportunity event suitably includes: a statement of type of asset involved (e.g., real-estate, securities, business); the symbol (corresponding to the symbology of financial statement indicia 20) for the type of asset; a statement of the particulars of the opportunity (e.g., buy rental house) including the cost of the opportunity; and a graphic representation of the additional units of periodic passive income (corresponding to the symbology of financial statement indicia 20) generated by the asset. Examples of Opportunity events are shown in Table 1.

TABLE 1

Exemplary Opportunity Events

| Nature of Opportunity | Particulars | Passive income generated |
|---|---|---|
| Home Business | You may start a new home business; start up costs-pay $260 | One $100 unit |
| Real estate | Buy rental house for $1,100 | Two $100 units and three $10 units |
| Securities | Buy 100 shares for $800 | One $100 unit |
| Real estate | Buy rental house for $900 | Two $100 units |
| Home Business | You may start a new home business; start up costs-pay $300 | One $100 unit and two $10 units |
| Real estate | Buy rental house for $1,400 | Two $100 units and four $10 units |
| Securities | Buy 100 shares for $1600 | Two $100 units |
| Home Business | You may start a new home business; start up costs-pay $340 | Two $100 units |
| Securities | Buy 100 shares for $1400 | One $100 unit and two $10 units |
| Securities | Buy 100 shares for $600 | four $10 units |
| Home Business | You may start a new home business | No passive income |
| Real Estate | Buy rental house for $750 | No passive income |
| Securities | Buy 100 shares for $900 | One $100 unit |
| Securities | Buy 100 shares for $700 | One $100 unit |
| Securities | Buy 100 shares for $800 | No passive income |
| Securities/Bank Deposit | Put money in Savings Certificate for $800 | One $10 unit |
| Securities/Bank Deposit | Buy Certificate of Deposit for $800 | Two $10 units |

As previously noted, in the preferred embodiment, game event indicia 30 includes a deck of printed cards 34 representing opportunity events. Referring now to FIGS. 3A–3D, (collectively referred to as FIG. 3), all of the opportunity cards of deck 34, suitably include a back face with a common design, preferably depicting each of the symbols for the respective types of assets, with the back ground the same color as the passive income symbol, e.g., green. For example, referring to FIG. 3A, an exemplary opportunity card 300 includes a back face 302, including the chosen symbol 304 for securities, the chosen symbol 306 for business, and the chosen symbol 308 for real-estate. If desired the passive income symbol (e.g., green circle) can also be depicted on the back face of the card. The information face of each of the opportunity cards of deck 34 includes, as shown in the examples of FIGS. 3B–3D, includes: a statement 310 of type of asset involved (e.g., real-estate, securities, business); the symbol 312 for the type of asset; a statement 314 of the particulars of the opportunity (e.g., buy rental house) including the cost of the opportunity; and a graphic representation 316 (corresponding to the symbology of passive income portion 208 of financial statement indicia 22, e.g., green circles) of the additional units of periodic passive income generated by the asset. As best seen in FIG. 3C, the passive income is represented by graphics of elemental units, e.g., $220 of passive income is represented by two $100 unit symbols 316A, 316B and two $10 unit symbols 316C, 316D, readily comprehensible by even younger children with minimum skills at mathematics.

In the preferred embodiment, asset cards 34 typically represent good investments i.e., assets that generate significant positive cashflow. However, the fact that in real life many investments are not good is suitably introduced by including several low income or no income items. If desired, purported assets (investments) that lose money (generate negative cash flow, and are thus effectively liabilities) can be included in the event set. However, in order to prevent confusion among younger players, such disguised liability "assets" are not included in the preferred embodiment.

Liabilities/expense events represent, e.g., the participation in various types of transactions or occurrences that cost the player money (requiring a cash payment) or increase periodic expenses. Such transactions or occurrences suitably fall into a predetermined number, e.g., three, of categories. For example, such categories may, as previously noted, include: "real-life expenses" (e.g., unexpected medical or dental episodes); non-essential (luxury) purchases or entertainment expenses (sometimes hereinafter referred to as "doodad expenses"); and "lifestyle" (necessity) transactions, representing large purchases affecting lifestyle or relating to necessities such as, for example, a purchase of a larger house. Particular items, e.g., an automobile or particular types of automobiles, can be characterized as a lifestyle transaction or "doodad" expense as desired. The transactions or occurrences can further be categorized by the method of payment, e.g., cash, credit card, using borrowed money, or long-term secured debt such as a mortgage. To facilitate correlation by younger players, a particular unique symbol is associated with each type of liability/expense and/or method of payment. For example, events requiring cash payments may be represented by the image of a checkbook and/or dollar sign symbol; events involving credit transactions by the image of a bill, and/or credit-card, and events requiring assumption of long-term or secured debt by the image of a house and mortgage. In addition, graphic representations associated with payment of cash or units of periodic expense (corresponding to the symbology employed on financial statement indicia 20) are incorporated into the indicia of the event. Preferably, certain events will provide a choice as to mode of payment, e.g., cash or credit, or cash or borrowed money, to teach the player the consequences of a credit purchasing and borrowing. Several variations of each type of liability/expense event are suitably included in the set of events, e.g., different combinations of cash paid out and periodic expense generated. In addition, plural instances of particular events may be included in the set. The set of liability/expense events suitably includes predetermined proportions of events involving the various types of liabilities/expenses and/or modes of payment. For example, a set of 30 events may include 3 "lifestyle/necessity" events, 10 "real life expense" events, and 17 "doodads". Likewise, the respective categories of liability/expense events suitably include predetermined proportions of the various modes of payment. For example, the 30 event set suitably includes 3 secured debts, 6 cash payments, 7 loans and 14 credit/cards (or choice) events.

The indicia of an individual liability/expense event suitably includes: a statement of type of liability/expense involved (e.g., "real-life", doodad, lifestyle); the symbol for the mode of payment (cash, credit, loan, mortgage); a statement of the particulars of the event (e.g., dentist cleans teeth); and a graphic representation (corresponding to the symbology of Financial statement indicia 20) of the additional units of periodic expense created and/or cash payment required by the event. Where a choice between modes of payments is provided, graphical representations of both the cash payment and potential increase in periodic expense are suitably provided. Examples of Liability/Expense events are shown in Table 2.

TABLE 2

Exemplary Liability/Expense Events

| Nature of Liability/Expense | Particulars | Amount/Consequences |
| --- | --- | --- |
| Doodad | Go bowling | $20 cash payment |
| Doodad | Take family to movies | $20 cash payment |
| Doodad | Borrow money for vacation | Increase expenses by five $10 units |
| Purchase of House | Mortgage payments increase | Increase expenses by two $100 units |
| Real Life Expense | Pay by credit card for doctors visit | Increase expenses by one $10 unit |
| Real Life Expense | Dentists visit Player's choice to pay cash or by credit card | $200 cash payment, or Increase expenses by one $10 unit |
| Purchase of House | First mortgage | Increase expenses by 1 $100 unit. |
| Doodad | Buy ice cream | $10 cash payment |
| Doodad | Family plays miniature golf | $20 cash payment |
| Doodad | Buy candy | $10 cash payment |
| Doodad | Go to waterslide | $50 cash payment |
| Doodad | Buy gold necklace | Increase expenses by 5 $10 units |
| Doodad | Buy computer and games | Increase expenses by 3 $10 units |
| Doodad | Buy bicycles for family | Increase expenses by 3 $10 units |
| Doodad | Buy puppy | Increase expenses by 1 $100 unit and 1 $10 unit |
| Doodad | Go to summer camp | Increase expenses by 1 $100 unit and 1 $10 unit |
| Doodad | Buy new party clothes | Increase expenses by 3 $10 units |
| Doodad | Buy wave runners | Increase expenses by 2 $100 units |
| Doodad | Buy doll Player's choice to pay cash or by credit card | $200 cash payment or Increase expenses by 1 $10 unit |

TABLE 2-continued

Exemplary Liability/Expense Events

| Nature of Liability/Expense | Particulars | Amount/Consequences |
| --- | --- | --- |
| Doodad | Buy new basketball shoes Player's choice to pay cash or by credit card | $200 cash payment or Increase expenses by 1 $10 unit |
| Doodad | Buy TV game system Player's choice to pay cash or by credit card | $400 cash payment or Increase expenses by 2 $10 units |
| Real Life Expense | Buy new fiimiture | Increase expenses by 4 $10 units |
| Real Life Expense | Buy school clothes | Increase expenses by 1 $10 unit |
| Real Life Expense | Put new roof on house | Increase expenses by 1 $100 unit |
| Real Life Expense | Pay moving expenses | Increase expenses by 3 $10 units |
| Real Life Expense | Buy four tires | Increase expenses by 3 $10 units |
| Real Life Expense | Car needs repairs | Increase expenses by 4 $10 units |
| Real Life Expense | Buy new clothes washer | Increase expenses by 1 $10 unit |
| Real Life Expense | Birthday Party Player's choice to pay cash or by credit card | $200 cash payment or Increase expenses by 1 $10 unit |
| Real Life Expense | Take grandparents to dinner Player's choice to pay cash or by credit card | $200 cash payment or Increase expenses by 1 $10 unit |

As previously noted, in the preferred embodiment, game event indicia 30 includes a deck of printed cards 36 representing liability/expense events. Referring now to FIGS. 4A–4F, (collectively referred to as FIG. 4), all of the liability/expense cards of deck 36, suitably include a back face with a common design, preferably depicting each of the symbols for the respective types of liabilities/expenses and/or modes of payment, with the back ground the same color as the periodic expense symbol, e.g., red. For example, referring to FIG. 4A, an exemplary liability/expense card 400 includes a back face 402, including the chosen symbol 404 for a loan, the chosen symbol 406 for payment on credit, and the chosen symbol 408 for long term/secured debt. If desired, the periodic expense symbol (e.g., red square) can also be depicted on the back face of the card. The information face of each of the liability/expense cards of deck 36 includes, as shown in the examples of FIGS. 4B–4F, includes: a statement 410 of type of liability/expense involved (e.g., "real-life", doodad, lifestyle); the symbol 412 for the mode of payment (cash, loan, credit, mortgage); a statement 414 of the particulars of the event (e.g., dentist cleans teeth); and a graphic representation 416 of the additional units of periodic expense created and/or cash payment required by the event. With specific reference to FIG. 4C, where a choice between modes of payments is provided, graphical representations of both the cash payment 416A and potential increase in periodic expense 416B are suitably both provided. As best seen in FIGS. 4D and 4E, periodic expense is represented by graphics of elemental units, e.g., $50 of periodic expense is represented by five $10 unit symbols 416C–416G, and $200 periodic expense is represented by two $100 unit symbols 416H and 416I. If desired, as illustrated in FIG. 4F, cash payments can likewise be represented by elemental graphic units ($1000, $100, $10), e.g., a cash expense of $20 is represented by two $10 unit symbols 416J, and 416K. The symbols for the various denominations of cash suitably replicate the corresponding the denominations of play money 40.

Miscellaneous/bonus ("sunshine") events represent, for example, other occurrences that can affect earned income, passive income, or expenses, or various aspects of game play. For example, salary increases, gifts, paying off a bill or loan, side businesses, dividends, rewards (for certain behavior, e.g., charitable activities), and prizes may be represented. To facilitate correlation by younger players, if an asset or liability is affected by the event, the particular symbol is associated with that type of asset or liability as well as a graphic representations of changes in units of passive income or periodic expense (corresponding to the symbology employed on financial statement indicia 20) are preferably incorporated into the indicia of the event. Graphic representations of cash, if cash is involved in the event, can also be incorporated into the indicia of the event, if desired. For example, a periodic stock dividend of $10 is suitably represented by the stock certificates symbol, together with a $10 unit passive income symbol. Several variations of each type of miscellaneous event are suitably included in the set of events. In addition, plural instances of particular events may be included in the set. In the preferred embodiment, to maintain playtime within desired limits (in accordance with typical children's attention spans, as will be discussed), all the miscellaneous events are preferably positive in effect, although some events may not apply to a particular player because that player does not have any of the particular asset or liability affected by the event.

If desired, an additional element of chance can be interjected in the game through the sunshine events. For example, certain of the events can provide for a variable reward e.g., cash, based upon operation of a pseudo random number generator, e.g., a spinner 60 (figure one), or about the role of one or more die. A similar variable can be employed, if desired, in connection with the opportunity and liability events, if desired. In the preferred embodiment, however, for the sake of simplicity, and to avoid possible confusion of younger players, the variable element is employed only in connection with the sunshine events and is restricted to cash.

The indicia of an individual "sunshine" event suitably includes: a statement of the nature of the event (e.g., salary up, pay off a bill, stock dividend, money making activity, charity event/reward/prize, gift, and start a business); a symbol indicating that the event is a "sunshine" (miscellaneous) event; and a statement of the particulars of the event, including, if an asset or liability is affected by the event, the particular symbol is associated with that type of asset or liability as well as a graphic representations of changes in units of passive income or periodic expense (corresponding to the symbology employed on financial statement indicia 20). The use of a symbol indicating a "sunshine" event helps to distinguish the event from opportunity and liability events in the minds of younger players, and prevent potential confusion from the inclusion of asset and liability symbols in the indicia of the "sunshine" event. Examples of "sunshine" events are shown in Table 3.

TABLE 3

Exemplary "Sunshine" Events

| Nature of Event | Basis | Particulars Amount/Reward |
|---|---|---|
| Salary Up | Promotion to manager | Increase earned income by two $100 units |
| Gift | Receive stock as gift | Increase passive income by two $10 units |
| Start Business | Hire other kids to clean houses | Increase passive income by one $100 unit |
| Securities Up | Market up | Increase passive income by one $10 unit for each security asset |
| Charity work | Volunteer work for charity | Take free turn |
| Pay off bill | Paid off smallest loan | Reduce expenses by amount of smallest loan |
| Make Money | Win prize as best charity fund raiser | Variable: Spin Cash Wheel |
| Make Money | Hold a garage sale | Variable: Spin Cash Wheel |
| Start Business | Hire other kids to recycle newspapers | Increase passive income by one $100 unit |
| Second Job | Agreed to baby-sit neighbor's child | Increase earned income by one $100 unit |
| Helping Others | You've been helping others | Cancel next "Doodad Expense" |
| Pay off bill | Paid off smallest credit card bill | Reduce expenses by amount of smallest credit card bill |
| Rents Up | Rent for rental units go up | Increase passive income by two $10 units for each rental house asset |
| Sales up | New product sells well | Increase passive income by one $10 unit for each business asset |
| Wage Increase | Boss recognizes hard work | Increase earned income by one $100 unit |
| Make Money | Sell old toys at the swap meet for cash | Variable: Spin Cash Wheel |
| Second Job | Agreed to mow the neighbor's lawn once a week for one year | Increase earned income by one $100 unit |
| Make Money | Collect and recycle cans | Variable: Spin Cash Wheel |

Figure 5A:
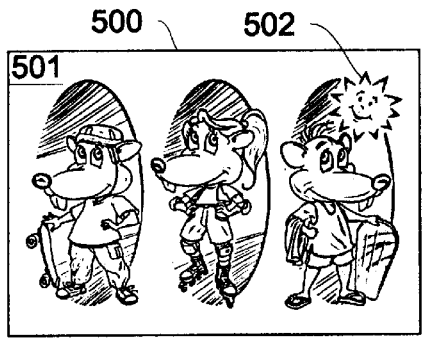
FIG. 5 (consisting of FIGS. 5A–5H) show an exemplary back face (FIG. 5A), and exemplary information faces (FIGS. 5B–5H) of miscellaneous (Sunshine) if cards employed in the preferred embodiment of a game in accordance with the present invention.
Figure 5E:
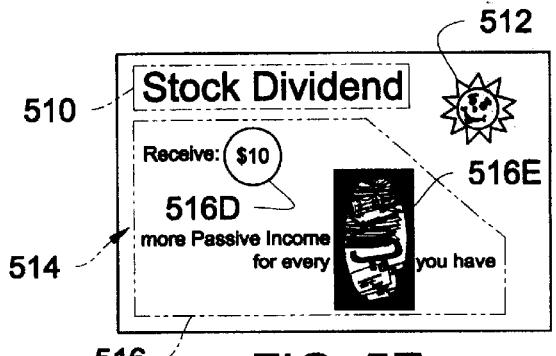
Figure 5B:
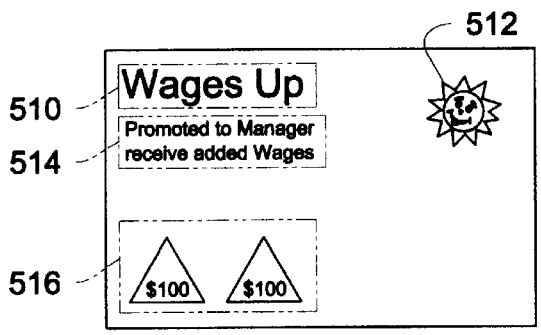
Figure 5F:
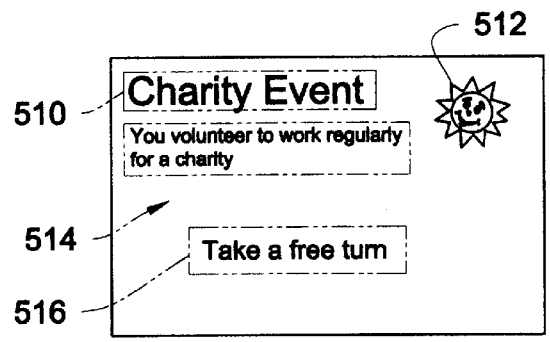
Figure 5C:

As previously noted, in the preferred embodiment, game event indicia 30 includes a deck of printed cards 32 representing sunshine events. Referring now to FIGS. 5A–5H, (collectively referred to as a FIG. 5), all of the sunshine cards of deck 32, suitably include a back face with a common design, preferably depicting the symbols for sunshine events. For example, referring to FIG. 5A, an exemplary sunshine card 500 includes a back face 501, including, among other things, a chosen symbol 502, e.g., a sun "face". The information face of each of the sunshine cards of deck 32 includes, as shown in the examples of FIGS. 5B–5H, includes: a statement 510 of type of event (e.g., "salary up", gift, start a business, etc); the symbol 512 for sunshine events; and a statement 514 of the particulars of the event (e.g., promoted to manager, receive additional salary). As illustrated in FIGS. 5B–5E, and 5G–5H, if an asset or liability is affected by the event, a graphic representation 516 of the effects of the event on financial statement indicia 22 is also included, suitably (but not necessarily) as part of statement 514; the particular symbol is associated with that type of asset or liability affected, as well as a graphic representations of changes in units of passive income or periodic expense (corresponding to the symbology employed on financial statement indicia 20) is also included on the card. If desired graphic representations of changes in units of cash can also be employed. For example, with specific reference to FIG. 5C, a gift of stock is suitably represented by an instruction 514A for the player to add the particular sunshine card to the players stock assets and obtain a securities icon from the bank and place it on the financial statement indicia 22, followed by symbols for the units of passive income attributed to the stock, in this case two $10 passive income unit symbols (e.g., green circles) 516A, 516B, together with a symbol 516C for a stock asset. Similarly, as illustrated in FIG. 5E, a stock dividend is suitably represented by an instruction to receive a number of units of passive income, represented as symbols for the units of passive income attributed to the stock, in this case one $10 passive income unit symbol (e.g., green circle) 516D, for each securities asset, signified by symbol 516E, held by the player. With younger players, it may be necessary to initially call the players' attention to the distinction between a gift of stock, and a stock dividend. However, once introduced to the distinction, even players having difficulty reading should be able to discern the difference between the respective cards.

Figure 5G:
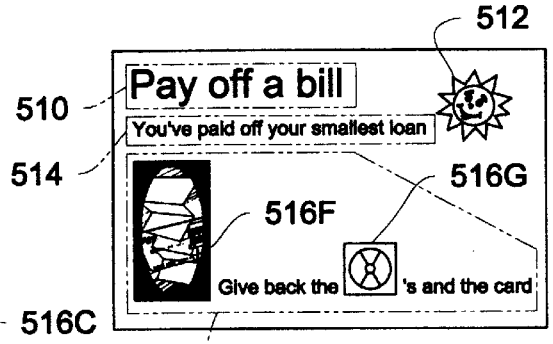
Figure 5D:
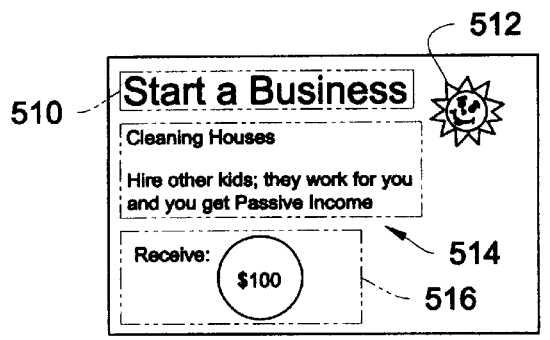
Figure 5H:
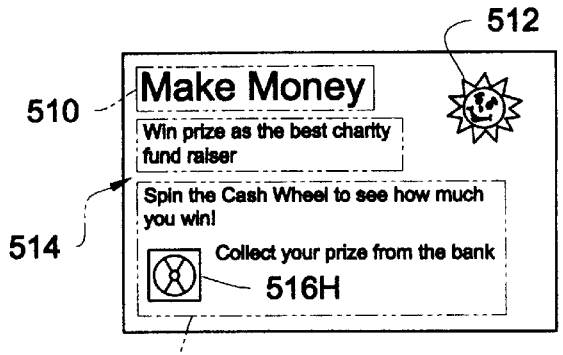

The desirability of reducing periodic expenses by paying off debt is suitably emphasized through the sunshine cards; as illustrated in FIG. 5G, paying off a bill is suitably one of the "sunshine" events. The information on the card suitably includes a statement to the effect that a loan (the player's smallest) has been paid off, and to return (to the bank) the smallest loan/credit liability card, related icon, and the periodic expense tokens associated with that loan. The instruction includes a symbol 516F for a loan/credit liability and a symbol 516G for a unit of periodic expense e.g., a red square.

As previously noted, an additional element of chance can be interjected in the game by providing for a variable reward e.g., cash, based upon operation of a pseudo random number generator, e.g., a spinner 60 (FIG. 1; sometimes hereinafter referred to as "cash wheel 60"), or about the role of one or more die. An example of such an event is illustrated in the FIG. 5H; in this case, the player is awarded a prize for charity fund-raising in an amount determined by "spinning the cash wheel". To aid younger players, a graphic symbol 516H of the "cash wheel" spinner is included in the instruction.

Figure 6:
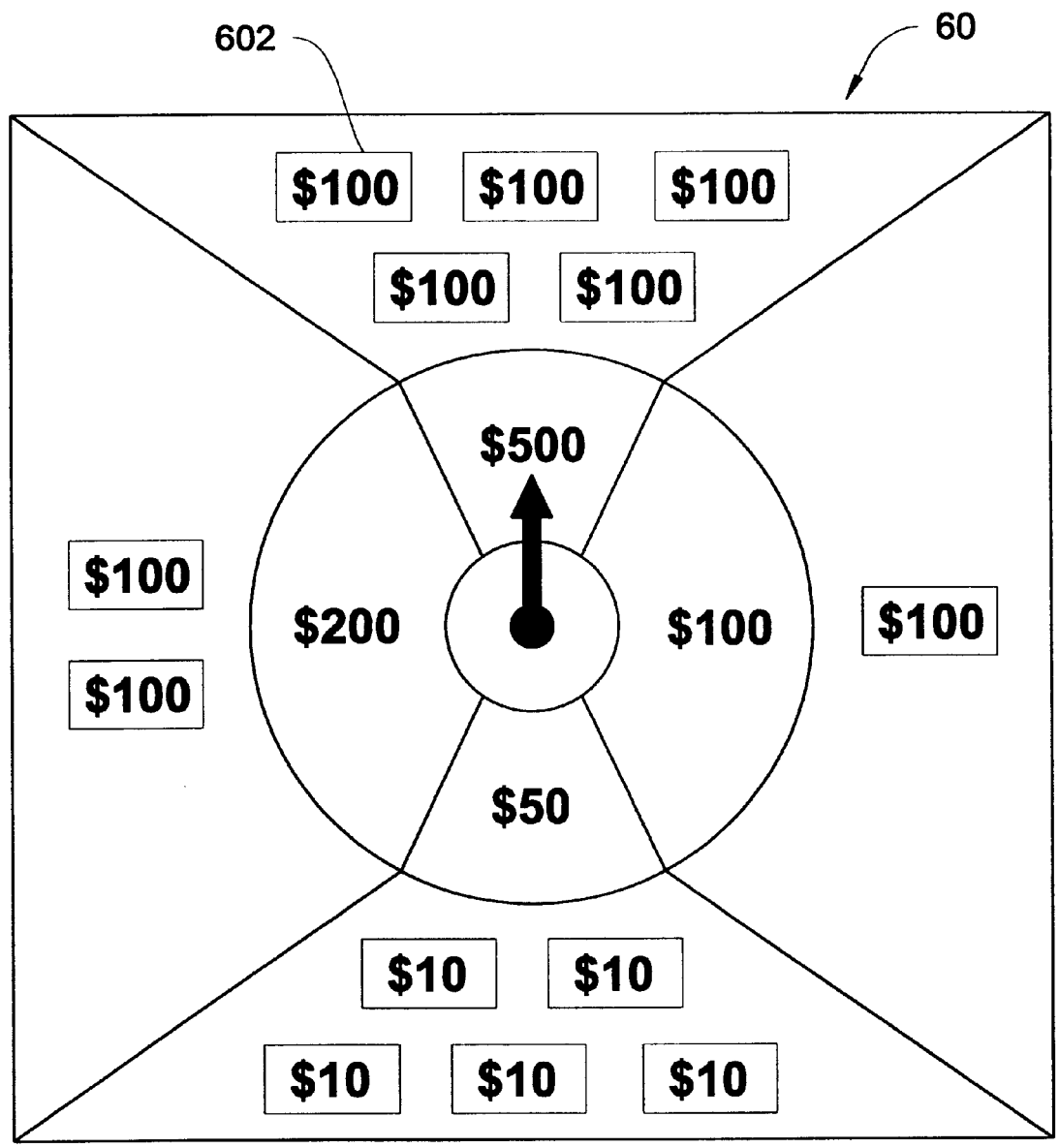
FIG. 6 is a schematic illustration of a suitable "cash wheel" spinner for use in one embodiment of a game in accordance with the present invention.

Referring now to FIG. 6, a suitable spinner 60 includes a plurality of sections, each corresponding to a predetermined amount of cash, e.g., $50, $100, $200, and $500. If desired, graphic representations of units of play money can be included on spinner 60 to aid younger players, e.g., $500 is represented by five $100 units 602. The graphic representation suitably corresponds to the color and/or design of the unit denomination of play money.

Event designating mechanism 50 can comprise any suitable mechanism for assigning events to the respective players and defining a pay period, i.e., calling for receipt of income and payment of expenses on a periodic basis (e.g., nominal month/number of turns/number of spaces advanced). For example, in an electronic version of game 10, indicia of events can be displayed for each player in turn, on a pseudo random basis (combining and selecting among opportunity, liability, and sunshine events), together with an occasional instruction (hereinafter sometimes referred to as a "paycheck" or "payday" instruction) to receive salary and passive income from, and pay expenses to, the bank. Such a payday instruction can issued on a periodic or pseudo random basis, preferably on a pseudo random basis but within certain boundary limits, e.g., a payday would occur a within a maximum number of turns.

Figure 7:
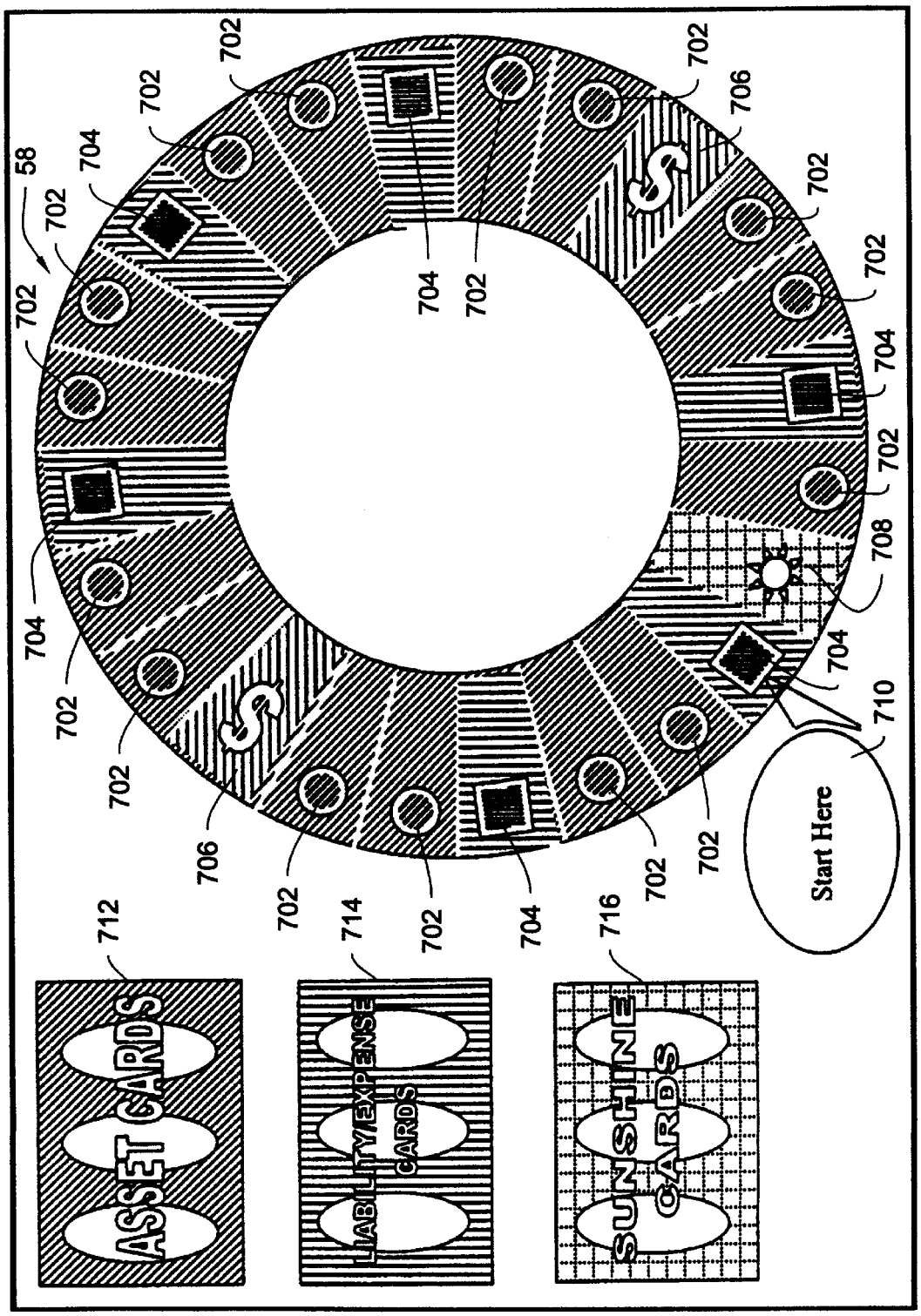
FIG. 7 is a schematic illustration of a suitable game board for use in one embodiment of a game in accordance with the present invention.

As previously noted, event designating mechanism 50 preferably comprises a pseudo-random number generator (e.g., a pair of dice 52, or spinner), player tokens 54, and a game board 56, bearing a track 58 of spaces corresponding to the drawing of event cards of designated categories, and at least one space (preferably 2) indicating a "payday". The number of spaces corresponding to the respective categories are in predetermined proportion to provide desired probabilities of events. Referring now to FIG. 7, a track 58 in the preferred embodiment includes a predetermined number of spaces e.g., 24, including: a predetermined number e.g., 15, of spaces 702 corresponding to opportunities; a predetermined number e.g., six, of spaces 704 corresponding to liabilities/expenses; a predetermined number e.g., two of "payday" spaces 706; and a predetermined number e.g., one, of spaces corresponding to sunshine events 708. The respective spaces are preferably correlated by visual aspect to the respective associated event categories, e.g.,: opportunity spaces 702 are of a color corresponding to income, e.g., green, and/or bear the a passive income symbol (e.g., a circle); liabilities/expenses 704 are of a color corresponding to liability/expenses e.g., red, and/or bear the periodic expense symbol (e.g., a square); and sunshine event space 708 is yellow and/or bears the sunshine symbol. Payday spaces 706 suitably bear dollar signs. One of the spaces of track 48 is designated as a starting point by a suitable symbol, e.g., an arrow 710.

Game board 56 suitably also includes portions 712, 714 and 716 designated to receive event card decks 34, 36, and 32, respectively. The preferred embodiment of game 10 accommodates 2 to 6 players.

Play of the preferred embodiment of game 10 is initiated by choosing a banker (often an adult, particularly when younger children are playing or a child with strong math and counting skills) to supervise and control the money and tokens. All money and counters are suitably received from or paid to the Bank. Card decks 32, 34 and 36 are shuffled and placed face down on game board 56. Each player chooses a colored token (playing piece) 54 and is provided a financial statement game card 22, together with earned income tokens 26 representing periodic earned income ascribed to the player e.g., $1000, and expense tokens 28 representing periodic expenses ascribed to the player e.g., $700, and an initial sum of play money 40 (e.g., three $1,000 bills). As noted above, starting earned income, as reflected by earned income tokens 26, is suitably set to a predetermined "round" number e.g., $1,000, for ease of "calculations", and starting total expenses, as reflected by expense tokens 28, are suitably set to a predetermined amount (e.g., $700), less by a predetermined percentage of earned income (e.g., 30%) than the amount of earned income.

The order of play is then determined. For example, each player rolls the dice to determine a first player; play begins with that player, then each successive player to the left plays in turn.

Each player in turn moves his or her token 54 along track 58, in accordance with the results of rolling dice 52. When a player lands on a particular space, he or she selects a card from the associated one of decks 32, 34 or 36. The players financial statement indicia 20 is modified accordingly, e.g., tokens and icons are placed on or taken off financial statement game card 22. When a player passes a paycheck space he or she receives from bank cash equal to the sum of earned and passive income, and pays to the bank a sum equal to the player's expenses. The first player to achieve a passive income greater than expenses is the initial winner. If desired, the winners badge with appropriate legend e.g., "I'm a cash flow kid" can be awarded to the initial winner, (typically worn until the completion of the game).

It is desirable that the overall length of game play be commensurate with the attention span of young players. Accordingly, it is desirable to fix a target number of turns for a typical player to complete (e.g., win) the game. The present inventors have determined that (a) a game length of approximately 90 minutes is a particularly appropriate target limit for 6 players, and (b), on the average, each player's turn will take approximately 1.25 minutes. A 90 minute game length thus permits a total of 72 player turns, equating to 12 turns for each of the six players. Accordingly, it is desirable that, in play, the game be average player be able to win (e.g., generate passive income greater than expenses) in 12 or less turns. Game event indicia 30, and event designating mechanism 50 are suitably designed such that sufficient assets are likely to be acquired in the predetermined target number of turns (e.g., 12) to generate a predetermined level of passive income in excess of the initial expenses plus expenses likely to be added by events, establishing the appropriate relative probabilities of obtaining an asset and acquiring a liability, as well as average passive income per asset and average expense per liability. Expressed mathematically:

$$\text{Number}_{turns}[(\text{Probability}_{Asset})(\text{PassiveIncome}_{Ave}) - (\text{Probability}_{Liability})(\text{Expense}_{Ave})] - \text{Expense}_{Ascribed} > 0 \quad \text{Eq'n (1)}$$

Where:

Number$_{turns}$ is the target number of turns

Probability$_{Asset}$ is the probability of landing on an asset space

PassiveIncome$_{Ave}$ is the average passive income generated by the assets

Probability$_{Liability}$ is the probability of landing on a liability space

Expense$_{Ave}$ is the average expense generated by the liabilities

Expense$_{Ascribed}$ is the initial expenses ascribed to the player.

To retain younger children's interest in the game, it is also desirable that assets be relatively easy to acquire; that on the average, the total money received during the course of the game will be greater than the cost of assets of the player is likely to draw. Expressed mathematically:

$$M_{total} - \text{AssetCost}_{total} > 0 \quad (2)$$

Where:

$M_{total}$ is the probable amount money acquired during the course of the game; and AssetCost$_{total}$ is the cost of assets of the player is likely to draw.

The probable amount money received during the course of the game, $M_{total}$, is a function of the initial amount of cash on hand (savings) provided the player at the beginning of the game (Savings$_{Ascribed}$), earned income, passive income, expenses, and number of "paydays" over the course of the game:

$$M_{total} = \text{Savings}_{Ascribed} + \text{Number}_{paydays}[(\text{EarnedIncome}_{Ascribed} - \text{Expense}_{Ascribed}) + \text{Number}_{turns}(\text{Probability}_{Asset})(\text{PassiveIncome}_{Ave}) - \text{Number}_{turns}(\text{Probability}_{Liability})(\text{Expense}_{Ave})] \quad (3)$$

The probable total cost of assets of the player is likely to draw during the course of the game, (AssetCost$_{total}$) is a function of the probability of landing on an asset space, (Probability$_{Asset}$), the average cost of the assets (AssetCost$_{Ave}$) and number of turns played over the course of the game (Number$_{turns}$):

$$\text{AssetCost}_{total} = \text{Number}_{turns}[(\text{Probability}_{Asset})(\text{AssetCost}_{Ave})] \quad (4)$$

Substituting equations 3 and 4 in equation 2

$$\text{Savings}_{Ascribed} + \text{Number}_{payday}[(\text{EarnedIncome}_{Ascribed} - \text{Expense}_{Ascribed}) + (\text{Probability}_{Asset})(\text{PassiveIncome}_{Ave}) - (\text{Probability}_{Liability})(\text{Expense}_{Ave})] - \text{Number}_{turns}[(\text{Probability}_{Asset})(\text{AssetCost}_{Ave})] > 0 \quad (5)$$

The relative proportion of spaces corresponding to the respective categories are suitably set to provide the desired probabilities and frequencies of events; as noted above with reference to FIG. 7, track 58 in the preferred embodiment includes 24 spaces in total, of which 15 spaces 702 correspond to opportunities, 6 spaces 704 correspond to liabilities/expenses; two spaces 706 correspond to "payday"; and one space 708 corresponds to sunshine events. Thus, in the preferred embodiment, for a given turn, the probability of obtaining an asset is 15 out of 24=62.5%, (or considering only assets and liabilities, 15 out of 21=71.4%) and the probability of acquiring a liability is 6 out of 24=25%, (or considering only assets and liabilities, 6 out of 21=28.5%).

Pay Day spaces 706 are suitably disposed 180 degrees from each other e.g., the sixth and eighteenth space from the start 710. Using two dice, 12 turns corresponds to an average of 84 spaces moved per player; during the course of game each player will circuit a 24 space track 58, on average, 3½ times, and, with two payday spaces 706 on track 58, pass a payday space 706 on average 7½ times during the course of the game. As previously noted, starting earned income (EarnedIncomeAscribed) is suitably set to a predetermined "round" number e.g., $1,000, for ease of "calculations", and starting total expenses (ExpenseAscribed), are suitably set to a predetermined amount (e.g., $700), less by a predetermined percentage of earned income (e.g., 30%) than the amount of earned income. The amount of initial savings (SavingsAscribed) is suitably chosen to be equal to a predetermined multiple (e.g., 10) of the difference between earned income and expenses (representing saves accumulated over a predetermined number (e.g., 10) of pay periods. Thus, in the preferred embodiment:

Number$_{turns}$=12,
Probability$_{Asset}$=62.5%,
Probability$_{Liability}$=25%
EarnedIncome$_{Ascribed}$=$1000
Expense$_{Ascribed}$=$700
Savings$_{Ascribed}$=$3000
Number$_{payday}$=7.5
Equation 1 becomes:

$$12[(0.625)(\text{PassiveIncome}_{Ave})-(0.25)(\text{Expense}_{Ave})]-\$700>0 \quad (6)$$

$$7.5(\text{PassiveIncome}_{Ave})-3(\text{Expense}_{Ave})-\$700>0 \quad (7)$$

$$2.5(\text{PassiveIncome}_{Ave})-\$233.3>(\text{Expense}_{Ave}) \quad (8)$$

Thus, in the preferred embodiment, choosing the average expense per liability, Expense$_{Ave}$=$100, the average passive income generated by the assets is chosen to be a value greater than $133.3, e.g., $145 or $162.5. The higher the value of the average passive income per asset (PassiveIncome$_{Ave}$) relative to the average expense per liability the easier for the players to win.

The probable amount money received during the course of the game, M$_{total}$, in the preferred embodiment may thus be expressed $$M_{total}=\$3000+7.5[(\$300)+12(0.625)(\$162.5)-12(0.25)(\$100)]=\$12,140.63 \quad (7)$$

And solving Equation 5 for AssetCost$_{Ave}$:

$$\$3000+7.5[(\$300)+12(0.625)(162.5)-12(0.25)(100)]-12[(0.625)(\text{AssetCost}_{Ave})]>0 \quad (7)$$

AssetCost$_{Ave}$<$1618.75

The lower the value of the average cost per asset (AssetCost$_{Ave}$) relative to the amount of money likely to be available to the players, the easier for the players to win. In the preferred embodiment AssetCost$_{Ave}$ is established at $943.75.

In the preferred embodiment, pictorial "how to be a banker" and "to start" and "how to play" instruction sheets 60 for young players are suitably included. The instruction sheets employ the various symbols, preferably reflecting both shape and color, for the various game elements encountered to facilitate understanding by relatively young players, such as, for example: savings/cash, earned income, passive income, expenses; the various event cards (opportunity 34, liabilities/expense 36, and sunshine 32), and species of spaces (opportunity 702, liabilities/expense 704, payday 706, and sunshine 708) on track 58. The depictions of spaces 702, 704, 706, 708, on instruction sheets 60 suitably approximate the shape (truncated pie section) as well as color-scheme and symbology of the spaces. For example, a "To Start" instruction sheet 60A suitably includes an instruction "get from the bank:" followed by symbols for by the appropriate number of earned income tokens 26 (e.g., one $1,000 denomination green triangle) and expense tokens 28 (e.g., seven $100 denomination red squares), followed by it be further instruction to "put the counters on your game card", and a depiction of a three $1,000 bills of play money. If desired, "To Start" instruction sheet 60A may also include a portion 64 providing a primer on how to read and interpret the event cards.

Exemplary "How To Play" and "How To Be Banker" pictorial instruction sheets are shown in Tables 4 and 5, respectively, where the symbols for the various game elements are indicated by the name of the elements contained within brackets, e.g., the symbol for passive income token 27 is represented in Tables 4 and 5 as {passive income token 27}. When used in the exemplary pictorial instruction sheets of Tables 4 and 5, the term "the game card" refers to game card 22, and "game board refers to game board 56.

TABLE 4

How To Play:

Get out the game board and choose a colored playing piece. Choose someone to be banker, help them set up. The bank gets all the {play money}, {earned income token 26, $1,000 denomination}, {earned income token 26, $100 denomination}, {passive income token 27, $1,000 denomination}, {passive income token 27; $100 denomination}, {passive income token 27, $10 denomination}, {expense token 28, $1,000 denomination}, {expense token 28, $100 denomination}, and {expense token 28, $10 denomination}.

TABLE 4-continued

Shuffle the card decks face down and place them on the game board.

Get a game card and the "to start" things from the bank.

Everyone rolls both the dice; the player with the highest total moves the number rolled, going clock wise around the track. The person on the first player's left goes next, and so on.

If you roll any "doubles" on the dice, draw one of these {sunshine card 32} right away.

You Win when your {Passive income token 27} total more than your {expense token 28}.
Spaces are both color and symbol coded like this:
When you pass or land on this space, {pay day space 706} get money equal to all of these {earned income token 26} & {passive income token 27} on your game card And then pay money equal to all of these: {expense token 28} on your game card.
If you can't pay your {expense token 28}, you have to start over. Give everything to the Bank, move to "Start Here" on the game board and then get the "To Start" things from the Bank again. Sorry, no borrowing allowed.

If you land here {opportunity space 702}, draw a same color card. These cards {opportunity space 702} are called assets. They give you {passive income token 27}.
You pay {play money} to buy them. You don't have to buy it if you don't want to. You cannot buy it if you do not have enough {play money}. Put your new {passive income token 27} and {asset icon} on your game card where they match and put the asset card where the symbol matches.
If you land here {liability/expense space 704}, draw a same color card. These cards {liability/expense space 704}, are called liabilities. They give you {expense token 28}.
Sorry, you have to take them and put them on your game card where they match. Put the Red liability card on your game card where the symbol matches.
If you roll doubles, land on, or pass over this space {sunshine space 708} draw one of these cards {sunshine card 32 }. Keep these cards. They help you win!

Havefun!

TABLE 5

How To Be Banker

The rules say that the Bank gets all of the {play money}, {earned income token 26, $1,000 denomination}, {earned income token 26, $100 denomination}, {passive income token 27, $1,000 denomination}, {passive income token 27; $10 denomination}, {expense token 28, $1,000 denomination}, {expense token 28, $100 denomination}, and {expense token 28, $10 denomination}.
It will be easier if you put each type of counter into a separate pile and each size of money into separate pile.

Every time someone gets or pays {play money}, it means from or to the bank.
When anyone passes or lands on this space, {pay day space 706}
The Bank gives them money equal to all of these {earned income token 26} & {passive income token 27} on their game card
And then collects money equal to all of these: {expense token 28} on their game card.
You may help younger children count their counters and their [play money]

When anyone draws any card, they might get more of any of these: {earned income token 26}, {passive income token 27} & {expense token 28}.
You can remind them to put these on their game card if they forget. Their also keep the card they draw, and collect an {icon 66} putting them on top of the matching symbol.

TABLE 5-continued

It is OK for you to play too.
And please keep your money separate from the Bank's.

If desired, additional (or alternative) rules can be employed to make the game more challenging for more experienced players and/or to teach particular concepts. For example:

"Doodad Expenses" (but not real life expenses) can be made optional. When a doodad card is drawn the Player may choose to buy the doodad or choose not to buy the doodad and return the doodad expense card to the bottom of the deck.

An option to pay out (prepay, retire) any periodic expense with cash (e.g., a one time payment of a predetermined multiple e.g., 20, of the periodic expense listed on the card) can be provided with respect to some or all expenses.

Earned income (e.g., salary) and/or initial expenses can be made a variable. The initial earned income ascribed to the player can be determined as part of the game set-up, e.g., the players salary would be set by rolling one or more die. For example, each player rolls the dice and receives earned income tokens 26 representing a predetermined base wage (e.g., $500) plus a predetermined amount (sometimes hereinafter referred to as a "variable wage multiplier") (e.g., $100) times the amount shown on the dice. Initial expenses ascribed to the player would be determined from the same roll of the dice e.g., a predetermined base expense (preferably less than the base wage, e.g., $400) plus a predetermined amount (preferably less than the variable wage multiplier, e.g., $50) times the amount shown on the dice.

Alternatively, salary could be adjusted on a payday by payday basis, e.g., made equal to a predetermined base (e.g., $500) plus a predetermined amount (e.g., $100) times the amount shown on the dice when passing a payday space 706.

A "progressive" graduated income tax can be established, adding taxes (expenses) applicable to earned and or passive income. Deductions for income generated by certain types of assets and or certain types of expenses can also be established.

The cost of assets can be made variable, e.g., determined by adding a number based on the value of diced rolled by he player that turn (e.g., $50 times the value rolled) to the price shown on the event card.

The income generated by various assets can be made variable. If desired different formula can be used to for the different types of assets. For example, the income generated by a "business" asset may be determined by rolling both dice after a player pays for the business. If the value rolled does not exceed a predetermined threshold value, e.g., 5, the "business" generates no passive income (representing the expenses entailed in the asset that must be accounted exceeded for positive cashflow). Assuming the threshold is met, the asset generates passive income in an amount equal to a predetermined multiplier, e.g., $20 for each point showing on the dice. The income generated by a "securities" asset may be likewise be determined by rolling both dice after a player pays for the security; the asset generates passive income in an amount equal to a predetermined multiplier, e.g., $20 for times the difference between a predetermined number, e.g., 6, from the number rolled. In the preferred embodiment, negative differences are treated as zero. Securities income can be computed, for example, when the security is acquired, or each time the sunshine space 708 is passed or, each time a payday space 706 is passed.

Circumstances reflecting loss of earned income (losing a job) can be incorporated into the game. For example, any player who rolls a predetermined number e.g., "2" or "12" "loses his or her job" for a predetermined number, e.g., 2 of paydays, i.e., receives a predetermined lesser amount (e.g., 0) of earned income the next successive times (e.g., 2) he or she passes payday spaces 706. If desired, expenses can also be lowered during the "jobless" period. For example, the player might receive only $300 wage income (irrespective of how many wage counters he or she has) and his or her expenses are $350 lower for each of the next two payday spaces.

While in the preferred embodiment, game 10 is implemented as a board game, game 10 is readily adaptable to a computer environment, and may be provided on a floppy disk, CD ROM or other suitable medium. Further, in an electronic embodiment, the game can be played by players at diverse locations via a local area network, wide area network or an extended network such as the Internet. Accordingly, the various terms employed in the above description to identify physical components, such as Game board 56 and track 58, tokens 24, 26, and 28, tokens 54, dice 52, cards 32, 34, and 36, play money 40 etc. should be taken to include electronic media equivalents.

The foregoing is a description of preferred exemplary embodiments and best mode of the invention known to the applicant at the time of filing the application. The invention is not limited to the specific forms shown. For example, modifications may be made in the design and arrangement of the elements within the scope of the invention, as expressed in the appended claims.

What is claimed is:

1. A game for teaching financial skills to players, wherein each player is initially ascribed a predetermined periodic earned income, at least initially representing income from work activities of the player, predetermined periodic expenses, and a predetermined amount of cash on hand, and the object of such game is for a player to generate passive income from assets greater than a predetermined percentage of the player's expenses, the game comprising:

indicia of cash on hand;

indicia of a financial statement associated with each player, and indicia of a set of game events for pseudo-random assignment to the players in turn;

the indicia of a financial statement including respective selectively revisable visual indicia of plural units of passive income, plural units of periodic expenses, assets and liabilities ascribed to the associated player;

each of the visual indicia of units of passive income having a first predetermined associated visual aspect, and units of periodic expenses having a second predetermined associated visual aspect; the visual indicia of assets and liabilities manifesting the first and second predetermined visual aspects, respectively;

the set of game events including events potentially affecting at least one of the cash on hand, passive income, expenses, assets and liabilities of the player, the set of events including opportunities to purchase assets with cash on hand to generate passive income;

the indicia of game events potentially affecting passive income manifesting the visual aspect associated with passive income, and the indicia of game events potentially affecting expenses manifesting the visual aspect associated with expenses, and the number of units of each of the financial statement visual indicia being selectively revisable to reflect the effects of game events.

2. The game of claim 1, wherein the indicia of a financial statement includes respective selectively revisable visual indicia of a plurality of denominations of units of passive income, and expenses.

3. The game of claim 2 wherein the visual indicia of each denomination of units of passive income, and expenses is grouped together in units of a predetermined number to aid in counting.

4. The game of claim 3 wherein to predetermined number is five.

5. The game of claim 1, wherein the indicia of a financial statement further includes respective selectively revisable visual indicia of units periodic earned income, having a predetermined associated visual aspect.

6. The game of claim 5, wherein the indicia of a financial statement includes respective selectively revisable visual indicia of a plurality of denominations of units of periodic earned income, units of passive income, and expenses.

7. The game of claim 1, further including indicia of cash on hand for each player.

8. The game of claim 7 wherein the indicia of cash on hand comprises play money script.

9. The game of claim 1, wherein the predetermined associated visual aspect of the visual indicia includes a characteristic color.

10. The game of claim 9 wherein the characteristic color of the units of passive income is green, and the characteristic color of the units of expenses is red.

11. The game of claim 9 wherein the indicia of a financial statement further includes respective selectively revisable visual indicia of units periodic earned income, having a characteristic color of blue.

12. The game of claim 1, wherein the predetermined associated visual aspect of the visual indicia includes a characteristic shape.

13. The game of claim 12 wherein the characteristic shapes of the units of passive income are circles, and the characteristic shape of the units of expenses are squares.

14. The game of claim 12 wherein the indicia of a financial statement further includes respective selectively revisable visual indicia of units periodic earned income, having a characteristic triangular shape.

15. The game of claim 9, wherein the predetermined associated visual aspect of the visual indicia also includes a characteristic shape.

16. The game of claim 15 wherein the visual indicia are grouped together in units of a predetermined number to aid in counting.

17. The game of claim 16 wherein to predetermined number is five.

18. The game of claim 1 wherein the visual indicia are grouped together in units of a predetermined number to aid in counting.

19. The game of claim 18 wherein the predetermined number is five.

20. The game of claim 15 wherein the indicia of a financial statement further includes respective selectively revisable visual indicia of units periodic earned income, and the visual indicia of the units of passive income are green circles, the visual indicia of the units of expenses are red squares and the visual indicia of the units of earned income are blue triangles.

21. The game of claim 1, wherein the indicia of a financial statement comprises a sheet bearing respective graphical symbols representing units of passive income, and expense, and respective sets of removable tokens each set of tokens for disposition on the sheet corresponding in at least one predetermined visual aspect to the symbol for an associated one of passive income, and expense.

22. The game of claim 21 wherein the sheet further bears graphical symbols representing units of earned income.

23. The game of claim 22 further including a set of tokens for disposition on the sheet corresponding in at least one predetermined visual aspect to the symbol for earned income.

24. The game of claim the 22 further including respective sets of icons corresponding to assets and liabilities.

25. The game of claim 21 wherein the corresponding predetermined visual aspects comprise at least one of a characteristic color and a characteristic shape.

26. The game of claim 25 wherein the symbols include an internal feature to help differentiate between symbols and tokens placed over symbols.

27. The game of claim 21 wherein the symbols are grouped together in units of a predetermined number to aid in counting.

28. The game of claim 21, wherein the sheet bears symbols for a plurality of denominations of units of passive income, and expenses.

29. The game of claim 28 wherein the symbols for each denomination of units of passive income, and expenses are a grouped together in units of a predetermined number to aid in counting.

30. The game of claim 29 wherein the predetermined number is five.

31. The game of claim 1, wherein the indicia of a financial statement includes:
a section relating to earned income; a section relating to passive income; and a section relating to expense,
the earned income section including symbols of predetermined visual aspect corresponding to units of earned income;
the passive income section including symbols of predetermined visual aspect corresponding to units of passive income, and
the expense section including symbols of predetermined visual aspect corresponding to units of expenses.

32. The game of claim 31 wherein the section relating to earned income; and the section relating to passive income have the same background color to indicate the relationship therebetween.

33. The game of claim 31 wherein the section relating to earned income; section relating to passive income; and section relating to expense each includes symbols corresponding to a plurality of denominations of units of earned income, passive income; and expense, respectively.

34. The game of claim 31 wherein:
the earned income section includes a plurality of sets of symbols manifesting the associated predetermined visual aspect corresponding to units of earned income, the respective sets of symbols varying in size to indicate different denominations of units of earned income;
the passive income section including a plurality of sets of symbols manifesting the associated predetermined visual aspect corresponding to units of passive income, the respective sets of symbols varying in size to indicate different denominations of units of passive income; and
the expenses section including a plurality of sets of symbols manifesting the associated predetermined visual aspect corresponding to units of expenses, the respective sets of symbols varying in size to indicate different denominations of units of expense.

35. The game of claim 31 wherein the indicia of a financial statement includes sets of removable tokens, each set of tokens corresponding in at least one visual aspect to the symbol for an associated one of earned income, passive income, and expense, and the symbols include an internal feature to help differentiate between symbols and tokens placed over symbols.

36. The game of claim 31 wherein the symbols are grouped together in units of a predetermined number to aid in counting.

37. The game of claim 36 wherein to predetermined number is five.

38. The game of claim 1, wherein the indicia of a financial statement comprises a display of selectively actuable symbols for earned income, passive income, expenses, assets and liabilities.

39. The game of claim 1, wherein the set of game events comprises respective categories of events, a first category including events potentially affecting the passive income of the player, and a second category including events potentially affecting the expenses of the player.

40. The game of claim 39 wherein the set of game events comprises a third category of events, the third category including events potentially affecting at least one of the player's cash on hand, earned income, passive income, expenses and game sequencing.

41. The game of claim 39 wherein the first category of events include opportunities to acquire assets of respective types, each type of asset having a characteristic symbol associated therewith included in the indicia of game events involving that type of asset.

42. The game of claim 41 wherein the indicia of events in the first category includes: a statement of type of asset involved; the symbol for the type of asset; a statement of the cost of the opportunity; and a graphic representation of the additional units of periodic passive income generated by the asset.

43. The game of claim 41 wherein the types of assets include real estate, securities, and businesses.

44. The game of claim 40 further including, for each type of asset respective icons manifesting the characteristic symbol.

45. The game of claim 39 wherein the second category of events include taking on liabilities/expenses of respective types, each type of liability having a characteristic symbol associated therewith included in the indicia of game events involving that type of liabilities/expense.

46. The game of claim 45 wherein the indicia of events in the second category includes: a statement of type of liabilities/expense involved; the symbol for the type of liability/expense; a statement of the cost of the opportunity; and a graphic representation of the additional units of periodic expenses generated by the liability/expense.

47. The game of claim 45 wherein the types of liability/expense categorized by the method of payment.

48. The game of claim 45 wherein the types of liability/expense include cash payment, payment by credit card, payment using borrowed money, and long-term secured debt.

49. The game of claim 47 wherein at least some of the second category of events of provide the player a choice between methods of payment.

50. The game of claim 49 wherein at least some of the second category of events of provide the player a choice between paying a predetermined amount from cash on hand, or taking on a predetermined periodic expense.

51. The game of claim 41 wherein the second category of events include taking on liabilities/expenses of respective types, each type of liability having a characteristic symbol associated therewith included in the indicia of game events involving that type of liabilities/expense.

52. The game of claim 51 wherein, and the indicia of events in the second category includes: a statement of type of liabilities/expense involved; the symbol for the type of liability/expense; a statement of the cost of the opportunity; and a graphic representation of the additional units of periodic expenses generated by the liability/expense.

53. The game of claim 51 wherein the set of game events comprises a third category of events, the third category including events potentially affecting at least one of the player's earned income, passive income, expenses and game sequencing.

54. The game of claim 53 wherein the indicia of events in the third category includes, for any asset or liability affected by the event, the particular symbol associated with that type of asset or liability, as well earned-income a graphic representation of changes in units of passive income or periodic expense caused by the event.

55. The game of claim 53 wherein the third category of events includes events whereby the player's cash on hand is changed by a pseudorandom amount.

56. The game of claim 53 wherein the third category of events includes events whereby the player's periodic expenses are reduced.

57. The game of claim 53 wherein the third category of events includes events whereby the player's earned income is increased.

58. The game of claim 1, wherein the indicia of events comprises respective decks of printed cards, each card representing an event potentially affecting the financial status of the player, where the respective decks of cards correspond to different categories of events.

59. The game of claim 58 wherein the first category of events include opportunities to acquire assets of respective types, each type of asset having a characteristic symbol associated therewith included in the indicia of game events involving that type of asset.

60. The game of claim 59 wherein the indicia of events in the first category includes: a statement of type of asset involved; the symbol for the type of asset; a statement of the cost of the opportunity; and a graphic representation of the additional units of periodic passive income generated by the asset.

61. The game of claim 58, further comprising a pseudorandom number generator, player pieces, and a game board bearing a track of spaces corresponding to the drawing of event cards of designated categories.

62. The game of claim 61 wherein the pseudo-random number generator comprises a pair of dice.

63. The game of claim 61 wherein spaces corresponding to the drawing of a card representing an event potentially affecting passive income manifests the predetermined first predetermined visual aspect, and each card representing an event potentially affecting expense manifests the second predetermined visual aspect.

64. The game of claim 61 wherein track includes a first predetermined number of spaces of which: a second predetermined number of spaces correspond to opportunities to acquire assets; a third predetermined number of spaces correspond to liabilities/expenses; and a fourth predetermined number of spaces correspond to paydays whereby earned income, and passive income are paid to, and expenses are paid by, the player.

65. The game of claim 64 wherein the first predetermined number of spaces is twenty-four, the second predetermined number of spaces is fifteen, the third predetermined number of spaces is six, and the fourth predetermined number of spaces is two.

66. The game of claim 64 wherein the set of game events comprises a third category of events, the third category including events potentially affecting at least one of the player's cash on hand, earned income, passive income, expenses and game sequencing, and track includes a fifth predetermined number of spaces corresponding to the third category of event.

67. The game of claim 58 wherein the indicia of a financial statement comprises a sheet bearing graphical symbols representing units of earned income, passive income, and expense, and respective corresponding removable tokens.

68. The game of claim 1, designed to result in a player generating passive income from assets greater than a predetermined percentage of the player's expenses within a predetermined target number of turns, wherein:

$$\text{Number}_{turns}[(\text{Probability}_{Asset})(\text{PassiveIncome}_{Ave})-(\text{Probability}_{Liability})(\text{Expense}_{Ave})]-\text{Expense}_{Ascribed}>0$$

Where:

Number$_{turns}$ is the target number of turns;

Probability$_{Asset}$ is the probability in a turn of a player being assigned an event potentially affecting the assets of the player;

PassiveIncome$_{Ave}$ is the average passive income generated by the assets;

Probability$_{Liability}$ is the probability in a turn of a player being assigned an event potentially affecting the liability of the player;

Expense$_{Ave}$ is the average expense generated by the liabilities; and

Expense$_{Ascribed}$ is the initial expenses ascribed to the player.

69. The game of claim 68, wherein within the target number of turns, the player typically encounters a predetermined number of paydays whereby earned income, and passive income are paid to, and $$\text{Savings}_{Ascribed}+\text{Number}_{payday}[(\text{EarnedIncome}_{Ascribed}-\text{Expense}_{Ascribed})+(\text{Probability}_{Asset})(\text{PassiveIncome}_{Ave})-(\text{Probability}_{Liability})(\text{Expense}_{Ave})]-\text{Number}_{turns}[(\text{Probability}_{Asset})(\text{Asset-Cost}_{Ave})]>0$$

Where Savings$_{Ascribed}$, EarnedIncome$_{Ascribed}$, Expense$_{Ascribed}$ are the initial predetermined amounts of cash on hand, periodic earned income, predetermined periodic expenses initially ascribed if to the player.

70. The game of claim 69, wherein:

Number$_{turns,}$=12,

Probability$_{Asset}$=62.5%,

Probability$_{Liability,}$=25%

EarnedIncome$_{Ascribed}$=$1000

Expense$_{Ascribed}$=$700

Savings$_{Ascribed}$=$3000

Number$_{payday}$=7.5.

* * * * *

UNITED STATES PATENT AND TRADEMARK OFFICE
CERTIFICATE OF CORRECTION

PATENT NO. : 6,106,300
DATED : August 22, 2000
INVENTOR(S) : Kiyosaki et al.

It is certified that error appears in the above-identified patent and that said Letters Patent is hereby corrected as shown below:

Column 19,
Line 64, after "expenses" delete "," and substitute -- ; --.

Column 20,
Line 1, after "claim 1" delete ",".
Line 9, after "wherein" delete "to" and substitute -- the --.
Line 11, after "claim 1" delete ",".
Line 15, after "claim 5" delete ",".
Line 19, after "claim 1" delete ",".
Line 22, after "money" delete "script" and substitute -- scrip --.
Line 23, after "claim 1" delete ",".
Line 38, after "characteristic" delete "shape" and substitute -- shapes --.
Line 43, after "claim 9" delete ",".
Line 49, after "wherein" delete "to" and substitute -- the --.
Line 63, after "claim 1" delete ",".
Line 66, after "tokens" insert -- , --.

Column 21,
Line 29, after "claim 1" delete ",".
Line 32, after "expense" delete "," and substitute -- ; wherein --.
Line 33, after "section" delete "including" and substitute -- includes --.
Line 36, after "section" delete "including" and substitute -- includes --.
Line 38, after "income" delete "," and substitute -- ; --.
Line 39, after "section" delete "including" and substitute -- includes --.
Line 42, after "income" delete ";".
Line 47, after "earned income" delete ";" and substitute -- , the --.
Line 47, after "passive income" delete "; and" and substitute -- , the --.
Line 57, after "section" delete "including" and substitute -- includes --.
Line 63, after "section" delete "including" and substitute -- includes --.

Column 22,
Line 11, after "wherein" delete "to" and substitute -- the --.
Line 13, after "claim 1" delete ",".
Line 17, after "claim 1" delete ",".
Line 39, after "including" delete ",".
Line 46, after "type of" delete "liabilities" and substitute -- liability --.
Line 49, before "/expense" delete "liabilities" and substitute -- liability --.
Line 50, after "cost of the" delete "opportunity" and substitute -- liability/expense --.
Line 54, after "expense" insert -- are --.
Line 60, after "events" delete "of".
Line 63, after "events" delete "of".
Line 67, after "events" delete "include" and substitute -- includes --.

UNITED STATES PATENT AND TRADEMARK OFFICE
CERTIFICATE OF CORRECTION

PATENT NO.     : 6,106,300
DATED          : August 22, 2000
INVENTOR(S)    : Kiyosaki et al.

It is certified that error appears in the above-identified patent and that said Letters Patent is hereby corrected as shown below:

Column 23,
Line 1, after "type" delete "of liability".
Line 3, after "type of" delete "liabilities" and substitute -- liability --.
Line 4, after "wherein" delete ", and".
Line 6, after "of" delete "liabilities" and substitute -- liability --.
Line 7, after "cost of the" delete "opportunity" and substitute -- liability/expense --.
Line 18, after "liability," delete "as well earned-income" and substitute -- and --.
Line 23, after "by a" delete "pseudorandom" and substitute -- pseudo-random --.
Line 30, after "claim 1" delete ",".
Line 36, after "events" delete "include" and substitute -- includes --.
Line 46, after "claim 58" delete ",".
Line 54, after "income" delete "manifests" and substitute -- manifest --.
Line 63, after "paydays" delete "whereby" and substitute -- wherein --.

Column 24,
Line 8, after "game sequencing , and" insert -- the --.
Line 11, after "of" delete "event" and substitute -- events --.
Line 16, after "claim 1" delete ",".
Line 55, after "ascribed" delete "if".
Line 59, after "12" delete "," and substitute -- ; --.
Line 60, after "62.5%" delete "," and substitute -- ; --.
Line 61, after "Liability" delete ","
Line 61, after "25%" insert -- ; --.
Line 62, after "$1000" insert -- ; --.
Line 63, after "$700" insert -- ; --.
Line 64, after "$3000" insert -- ; and --.

Signed and Sealed this

Tenth Day of September, 2002

*Attest:*

JAMES E. ROGAN
*Attesting Officer*  *Director of the United States Patent and Trademark Office*